United States Patent [19]

Mattes et al.

[11] Patent Number: 4,638,179
[45] Date of Patent: Jan. 20, 1987

[54] EXTENDED RESPONSE TRIGGER CIRCUIT

[75] Inventors: Bernhard Mattes, Sachsenheim; Klaus Oswald, Denkendorf; Wadym Suchowerskyj, Leonberg, all of Fed. Rep. of Germany

[73] Assignee: Robert Bosch GmbH, Stuttgart, Fed. Rep. of Germany

[21] Appl. No.: 704,471

[22] Filed: Feb. 22, 1985

[30] Foreign Application Priority Data

Mar. 31, 1984 [DE] Fed. Rep. of Germany ..... 84103592

[51] Int. Cl.$^4$ ............................................. B60R 21/08
[52] U.S. Cl. .............................. 307/10 SB; 307/10 R; 340/52 H; 340/52 R; 280/735
[58] Field of Search ..................... 307/10 SB, 9, 10 R; 340/52 R, 52 E, 52 H, 52 F, 53, 61; 180/268, 270, 271, 274, 282; 280/728, 733, 734, 735, 736, 748, 752, 753, 801-808

[56] References Cited

U.S. PATENT DOCUMENTS

| 3,870,894 | 3/1975 | Brede et al. | 340/52 H X |
| 3,911,391 | 10/1975 | Held et al. | 280/735 X |
| 4,020,453 | 4/1977 | Spies et al. | 280/735 X |
| 4,021,057 | 5/1977 | Held et al. | 280/735 |
| 4,117,730 | 10/1978 | Spies et al. | 340/52 H X |
| 4,317,105 | 2/1982 | Sinha et al. | 340/52 R |
| 4,357,594 | 11/1982 | Ehrlich et al. | 340/52 H X |
| 4,410,875 | 10/1983 | Spies et al. | 340/52 H |

Primary Examiner—William M. Shoop, Jr.
Assistant Examiner—Shik Luen Paul Ip
Attorney, Agent, or Firm—Frishauf, Holtz, Goodman & Woodward

[57] ABSTRACT

To provide for reliable explosion of an explosive pill, or the like in a passenger restraint system, for example to trigger an air belt, or a seat belt lock, an input signal derived from an impact transducer is applied to an integrator, the integrator being connected to a threshold circuit, to filter noise signals and the output signal from the threshold circuit being applied to an output terminal (8) for connection to the explosive pill or charge. To provide for reliable triggering of the explosive pill or charge, even if the input to the threshold circuit from the integrator passes the threshold level only for a very short period of time, so that the output signal from the threshold circuit (3) is below a desired minimum for triggering the explosive pill, the integrator is coupled to a threshold level circuit (1), the threshold setting of which is modified or changed upon occurrence of an output signal from the threshold circuit, by differentiating the output signal from the threshold circuit and modifying the threshold level in accordance with a differentiated signal; in the alternative, the output signal from the threshold circuit is passed through a summing circuit such as an OR gate (52) and, simultaneously used to trigger a monostable element (51), the output of which is summed in the OR gate to provide for an extended output UA at the output terminal of the system.

8 Claims, 3 Drawing Figures

EXTENDED RESPONSE TRIGGER CIRCUIT

The present invention relates to a trigger circuit and more particularly to a circuit to extend the response time during which an output signal is available, upon being triggered by a trigger input signal, and more particularly to a system and circuit suitable for use in combination with an automotive passenger restraint system, such as a trigger system for an explosive pill or firing primer or plug used in triggering an air bag, or a passenger restraint belt system.

BACKGROUND

Passenger restraint systems are known which use an explosive pill to inflate an air bag, or to lock a seat belt or seat belt-shoulder belt combination system (see, for example U.S. Pat. No. 3,701,903, to which German patent disclosure document DE-OS No. 21 51 399 corresponds). In such a system, a piezoelectric crystal is utilized as a mechanical-electrical transducer, the mechanical-electrical transducer being connected to a voltage limiting device which, in turn, is connected to an integrator which then is connected to a threshold circuit. The threshold circuit, when the threshold is exceeded, provides the actual trigger pulses, for example, for an explosive pill, which, when triggered, permits compressed air to inflate an air bag, or to lock a belt restraint system. Upon impact, the mechanical-electrical transducer provides an output signal which, in case of a collision, is large enough to trigger the system to operation.

It has been found that shocks which should trigger the operation may not cause output signals from the integrator of such a nature that the threshold circuit is energized for a sufficiently long period to respond, so that the threshold circuit itself will provide an output signal only for a very short period of time, and the danger, then, may result that this extremely short output signal will be insufficient to reliably ensure that the explosive pill, or primer will be triggered. Consequently, reliable operation of the passenger restraint system is not ensured.

It has been proposed to construct the threshold circuit in the form of a Schmitt-trigger with hysteresis. This arrangement, however, does not influence the operation of the integrator and a certain minimum response period, required by the explosive charges from the threshold circuit is still not ensured.

THE INVENTION

It is an object to provide a circuit which is particularly suitable with combination with a passenger restraint system to provide for extended response of the circuit upon being triggered, even though the trigger pulses may be very short in relation to the desired response time.

Briefly, the circuit includes an integrator which is coupled to a threshold circuit, the response period of which is to be extended. In accordance with a feature of the invention, the circuit provides for a predetermined minimum response time of the threshold circuit; in accordance with a preferred feature of the invention, the integrator is coupled to a reference level generator which reference level is changed as a result of output signals derived from the threshold circuit so that, if the threshold level of the threshold circuit is exceeded, the output thus recognized is fed back to the input of the integrator and lowering its reference level thereby extending the integrator output and hence also the time duration of the output signal from the threshold circuit.

In accordance with a preferred feature of the invention, the output signal of the threshold circuit is differentiated, and the differentiated signal fed back to the input of the integrator, to change the reference level with respect to which the integrator integrates.

The response period of the threshold level can also be extended by coupling the output of the threshold level circuit through an OR gate to the output thereof, the OR gate having a second input which is connected to the threshold level circuit through a timing circuit, such as a multivibrator so that the duration of the output pulse available from the OR gate is the sum of the duration of the pulse from the threshold circuit, directly, as well as the extended pulse provided by the timing circuit.

The system has the advantage that the minimum response time of the threshold circuit will exceed a predetermined duration so that, even if the input pulses are extremely short, output pulses of sufficient length of time are available, preferably, for example, to be of sufficient length to reliably explode explosive pills of a passenger restraint system.

When using an integrator, which has a reference level source as a response level element, with respect to which the integrator integrates, it is a simple matter to provide a feedback network which so influences or shifts the reference value that the input signal exceeds the reference value of the integrator for a predetermined period of time. Preferably, the bandwidth of the input signal will be limited. The feedback network can recognize a flank of the output signal of the threshold circuit by differentiation, and the so derived differentiated signal is then applied to modify the reference level of the integrator. The differentiation should be carried out only in one direction of the flank, for example by including a diode in the circuit, so that the reverse flank of the output pulse does not influence the reference level change at all. Utilizing an integrator with a reference level input also permits applying the output at the same time to a summing circuit and to a monostable circuit, the summing circuit, for example, forming an OR gate. This permits constructing a portion, at least, of the system in digital form, by constructing the timing circuit or monostable circuit as a monostable multivibrator, and the summing circuit as an OR gate. In an analog technology, the monostable element may be formed a differentiator, and the summing circuit by a resistance network.

DRAWINGS

DETAILED DESCRIPTION

Figure 1:
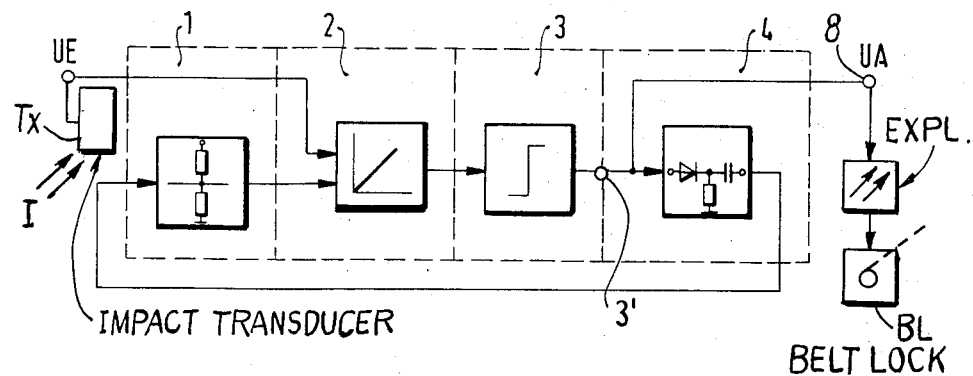
FIG. 1 is a schematic block circuit diagram showing an embodiment of the system.

An integrator 2 (FIG. 1) receives an input signal UE for integration. A reference level circuit 1 is likewise connected to the integrator which provides a reference value as a response level set for the integrator, with respect to which the integrator 2 is to integrate. The input signal UE is a signal derived, for example, from a mechanical-electrical transducer Tx, such a piezoelectric impact transducer, schematically shown in block form, to which impact forces schematically shown as arrows I can be applied.

The output signal from integrator 2 is applied to a threshold circuit 3 which provides a pulse when the output signal of the integrator 2 exceeds the threshold level of the threshold circuit 3. The output signal from the theshold circuit 3, which, simultaneously, forms the output signal UA of the present invention is additionally applied over a feedback circuit 4 to influence, or modify the reference level formed by the reference level circuit 1, so that a certain predetermined minimum response period or time for the threshold circuit 3 is ensured. The output signal UA is available at terminal 8, and can be applied to an explosive charge or pill EXPL which, in turn, triggers response of a passenger restraint system, such as an air bag or a belt lock BL locking a passenger restraint belt system in place.

Figure 2:
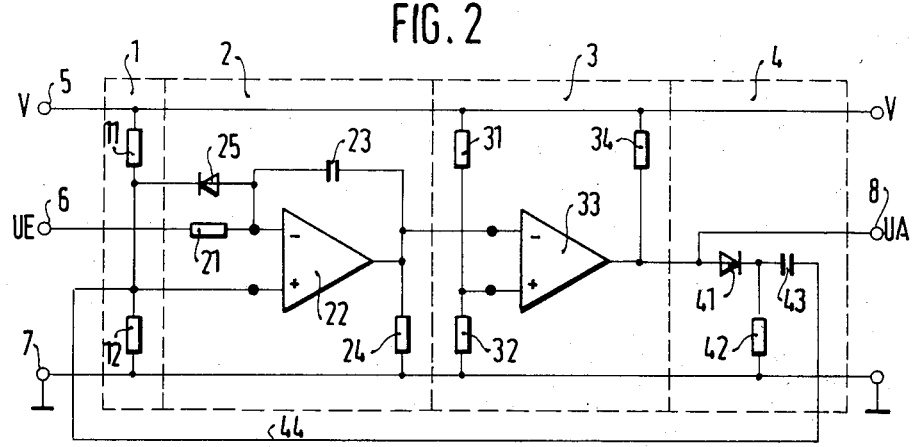
FIG. 2 is a more detailed circuit diagram of the arrangement of FIG. 1.

The general block diagram of FIG. 1 is shown in expanded, circuit diagram form in FIG. 2. The input signal UE is applied to an input terminal 6. The integrator is formed by an operational amplifier, connected as a difference amplifier, having an integrating capacitor 23, an integrating resistor 21, and an output resistor 24. The circuit is connected such that the direct input is coupled to a voltage divider formed by two resistors 11 and 12. Two voltage supply buses 5,7 are provided, for power supply, in which the bus 7 is further connected to a ground, or chassis terminal. Power supply to the respective amplifiers have been omitted for simplicity, and, of course, can be connected as well known. Compensating circuitry, further, of the amplifier 22 has been omitted and can be used, as required and is well known. The reference value itself is provided by the input voltage divider 11,12 connected between the supply terminals 5 and 7, and having the adjunction or tap point connected to the direct input of the operational amplifier 22. A diode 25 limits the charge which can be placed on an integration capacitor 23 if the input voltage UE is highly positive. The input voltage UE from terminal 6 is coupled through the coupling and integrating resistor 21 to the inverted input of the operational amplifier 22.

The output signal from the integrator 2, connected across an output resistance 24, is connected to an input of a second operational amplifier 33, likewise connected as a differential amplifier, having a threshold setting formed by two resistors 31,32 and connected to the other input of the operational amplifier. The output of the differential amplifier 33 is connected through a resistor 34 to the positive bus 5 and, further, to the output terminal 8, having the output signal UA there at.

The feedback network 4 is formed by a diode 41, connected in conductive direction to the junction of a resistor 42 and a capacitor 43 which, together form a differentiating network. The capacitor 43 differentiates the voltage across the resistor 42, and, over a feedback line 44, provides for feedback of the differentiated value to the junction or tap point between the voltage divider input resistors 11,12 connected to the integrating amplifier 22.

OPERATION

Let it be assumed that the input signal UE has a voltage which corresponds to the voltage at the direct input to the operational amplifier, that is, in the example shown, to the voltage at the tap point of the voltage divider 11,12. The integrating capacitor 23 will then be so charged that the output of the amplifier 22 will be at ground or bus 7 voltage. The output of the differential amplifier 33 then, likewise, will be at ground or chassis potential. When, for example, by an impact on the impact transducer Tx, a signal appears at input terminal 6, such that the input signal UE drops below the reference level of the integrator 2, current will flow in the integrator capacitor 23 which would recharge and the voltage at the output of the differential amplifier 22 will rise. When the threshold of the threshold level amplifier 33 is exceeded, a positive signal flank will appear at the output of the differential amplifier 33. This positive signal flank is conducted over diode 41 and will cause a voltage drop across resistor 42 which is differentiated by the capacitor 43, permitting additional current of the capacitor 43 to flow in the voltage divider of the resistors 11,12, which defines the reference value. This additional current will result in a rise in the reference value of the integrator 2, thus increasing the time during which the input signal UE will be held below the reference value at the direct input to the amplifier 22. Consequently, the time duration of the signal applied to the threshold circuit 3 is extended, that is, a predetermined response time for the threshold circuit 3 is obtained.

Figure 3:
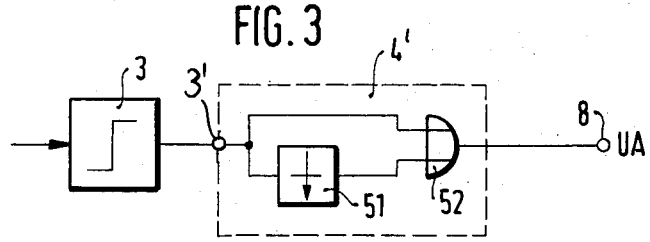
FIG. 3 is a fragmentary circuit diagram, showing another embodiment.

The output terminal from threshold circuit 3 is shown in FIG. 1 at terminal 3'. In accordance with a further embodiment of the invention, the circuit of FIG. 1 is interrupted at terminal 3' and, instead, the circuit of FIG. 3 is used, where terminal 3' again is shown. The remaining circuit, ahead of the threshold circuit 3 will be identical to that of FIG. 1, except that the feedback line 44 to the reference level setting circuit 1 will be omitted.

In the embodiment of FIG. 3, the output signal from the threshold circuit 3, connected through terminal 3' is connected to a time extension circuit 4', which is formed by a monostable circuit 51 and an OR gate 52, which has applied thereto the output from the monostable circuit 51 and, also, directly the outputs from threshold circuit 3. The output from the circuit 4' is connected to the output terminal 8, carrying the signal UA.

OPERATION

Upon occurrence of a positive flank of a signal at the output from the threshold circuit 3, monostable element 51 is triggered, so that, even if the output pulse from the threshold circuit 3 should be extremely short, the output signal at terminal 8 can be extended by the timing interval defined by the monostable element 51. The initial output pulse from the threshold circuit 3 is conducted through the OR gate 52, and the extension thereof derived from the timing circuit 51. The output voltage UA thus, will have an extended time, defined by the response period of the monostable element 51.

In accordance with a preferred embodiment, the threshold circuit 3 includes hysteresis; this is desirable for both of the embodiments of FIG. 2 as well as FIG. 3.

The circuits, of course, are not limited in use merely for a passenger restraint system in motor vehicles. The circuits may be used wherever a system which is to be controlled is triggered by a trigger pulse which has a time duration below that of the trigger pulse of the controlled system. Thus, the trigger pulse for the control system may require an extended operating time, some minimum time, for example due to safety requirements, for example, if loads having high input capacity are to be controlled; relays; or current supply circuits.

For such applications, a very short initial pulse may be of insufficient energy and/or time duration, and the circuit can be used in such applications as well.

We claim:

1. Extended response trigger circuit, particularly for a passenger restraint system in a motor vehicle, having
   means (Tx) for providing a trigger signal (UE);
   a reference forming circuit (1) providing a reference level signal;
   an integrator (2) receiving the trigger and reference level signals and providing an integrated trigger output signal;
   a threshold circuit (3) connected to an responsive to the integrated trigger output signal from the integrator (2); and
   an output circuit (EXPL) coupled to and responsive to output (3') of the threshold circuit (3) and requiring a signal of a predetermined minimum duration,
   and comprising, in accordance with the invention,
   feedback means (4, 44) coupled to said output (3') of the threshold circuit (3) and to an input of said reference forming circuit (1), for extending the duration of the response of the threshold circuit (3) by modifying the reference level signal applied to said integrator (2).

2. Circuit according to claim 1, wherein the means for modifying the reference level of the reference forming circuit (1) comprises a differentiator (4) coupled to the output of the threshold circuit.

3. Circuit according to claim 1, further including means (41) for sensing the polarity of an output flank of the output signal from the threshold circuit (3), and passing only the leading flank of said output signal to the means for modifying the reference level of the reference forming circuit (1).

4. Circuit according to claim 2, including diode (41) coupled to the input of the differentiator and passing only signals from the threshold circuit of the polarity of the leading flank of said signal.

5. Extended response trigger circuit, particularly for a passenger restraint system in a motor vehicle having
   means (Tx) for providing a trigger signal (UE);
   an integrator (2) receiving the trigger signal and providing an integrated output;
   a threshold circuit connected to and responsive to the trigger output signal from the integrator; and
   an output circuit (EXPL) coupled to and responsive to the threshold circuit and requiring a signal of a predetermined minimum length,
   and comprising in accordance with the invention,
   means coupled to the threshold circuit and extending the duration of an output signal derived from the threshold circuit.

6. Circuit according to claim 5, wherein the means to extend the time duration of the output signal derived from the threshold circuit comprises a monostable timing circuit (51), and an adding circuit (52) receiving the output from the monostable timing circuit and from the threshold circuit, the adding circuit summing the direct output received from the threshold circuit and the timing output received from the timing circuit (51).

7. Circuit according to claim 6, wherein said adding circuit comprises an OR gate (52).

8. Circuit according to claim 5, wherein said timing circuit comprises a monostable element.

* * * * *